United States Patent [19]

Hirokane et al.

[11] Patent Number: 5,777,953
[45] Date of Patent: Jul. 7, 1998

[54] ARRANGEMENT OF MAGNETO-OPTICAL RECORDING MEDIUM WHICH CAPABLE OF REPRODUCING AN INDIVIDUAL BIT

[75] Inventors: Junji Hirokane, Nara; Junichiro Nakayama, Shiki-gun; Junsaku Nakajima, Kashihara; Akira Takahashi, Nara; Kenji Ohta, Kitakatsuragi-gun, all of Japan

[73] Assignee: Sharp Kabushiki Kaishia, Osaka, Japan

[21] Appl. No.: 769,254

[22] Filed: Dec. 18, 1996

[30] Foreign Application Priority Data

Dec. 25, 1995 [JP] Japan .................................. 7-336698

[51] Int. Cl.$^6$ ............................................ G11B 11/00
[52] U.S. Cl. .................. 369/13; 428/694 ML; 428/694 MM
[58] Field of Search ................... 369/13, 14, 110; 360/59, 114; 365/122; 428/694 ML, 694 MM, 694 FC

[56] References Cited

U.S. PATENT DOCUMENTS

| | | |
|---|---|---|
| 5,278,810 | 1/1994 | Takahashi et al. ........... 369/13 |
| 5,283,770 | 2/1994 | Nakao et al. ............... 369/13 |
| 5,428,585 | 6/1995 | Hirokane et al. ........... 369/13 |
| 5,633,838 | 5/1997 | Hirokane et al. ........... 369/13 |

OTHER PUBLICATIONS

K. Tamanoi, et al., Magneto-Optical Recording International Symposium, *Magnetically-Induced Super Resolution Using Magneto-Static Coupling*, pp. 126, Sep., 1994.

*Primary Examiner*—Tan Dinh
*Attorney, Agent, or Firm*—David G. Conlin; Brian L. Michaelis

[57] ABSTRACT

A magneto-optical recording medium is arranged so that (1) a first transparent dielectric layer, (2) a reproduction layer showing in-plane magnetization at room temperature while showing perpendicular magnetization in response to temperature rise, (3) a second transparent dielectric layer, (4) a recording layer made of perpendicular magnetization film; and (5) a protective layer are laminated on a substrate in this order. The reproduction layer has a thickness of 5 nm to 30 nm, the second transparent dielectric layer has a thickness of 6 nm to 40 nm, and the recording layer has a thickness of 20 nm to 80 nm. It is possible to separately reproduce individual recording bit even when one or more adjacent recording bits exist within the diameter of the light beam converged onto a target recording bit. This is because the information of a recording magnetic domain of a portion showing in-plane magnetization is masked.

16 Claims, 6 Drawing Sheets

ARRANGEMENT OF MAGNETO-OPTICAL RECORDING MEDIUM WHICH CAPABLE OF REPRODUCING AN INDIVIDUAL BIT

FIELD OF THE INVENTION

The present invention relates to a magneto-optical recording medium, such as a magneto-optical disk, a magneto-optical tape, and a magneto-optical card, for use in a magneto-optical recording and reproduction apparatus, and also relates to a method for reproducing of information from the magneto-optical recording medium.

BACKGROUND OF THE INVENTION

Magneto-optical recording media have been conventionally put to practical use as a rewritable optical recording medium. Such magneto-optical recording media have presented the following drawback. More specifically, when each diameter of recording bits (recording-use megnetic domains) and a spacing between the recording bits become smaller with respect to the diameter of a light beam spot, which is obtained by converging onto the magneto-optical recording medium a light beam projected from a semiconductor laser, the reproduction characteristics are likely to deteriorate accordingly.

Such a drawback is derived from the fact that it becomes hard to separately reproduce individual recording bit because one or more adjacent recording bits exist within the diameter of the light beam converged onto a target recording bit.

In order to overcome such a drawback, a magneto-optical recording medium is proposed in Japanese unexamined patent publication No. 6-150418/1994. The magneto-optical recording medium is provided with a reproduction layer, a recording layer, and a non-magnetic layer between the reproduction and recording layers, the reproduction layer showing in-plane magnetization at room temperature while showing perpendicular magnetization in response to temperature rise, thereby ensuring static magnetic-coupling between the reproduction and recording layers.

According to the proposed magneto-optical recording medium, it is possible to separately reproduce individual recording bit even when one or more adjacent recording bits exist within the diameter of the light beam converged onto a target recording bit. This is because the information of a recording magnetic domain showing in-plane magnetization is masked.

However, according to Japanese unexamined patent publication No. 6-150418/1994, the following was confirmed. More specifically, when the recording and reproduction operations were carried out with respect to a smaller diameter of recording bits having a smaller spacing therebetween, it was necessary to apply a greater magnetic field for recording and erasing of information. This is because a leakage magnetic field due to the magnetization of the reproduction layer arrived at the recording layer.

SUMMARY OF THE INVENTION

It is an object of the present invention to provide a magneto-optical recording medium (1) which can be reproduced even when recording operation is carried out with respect to a smaller diameter of recording bits having a smaller spacing therebetween and (2) which can be recorded or erased by a smaller magnetic field.

In order to achieve the foregoing object, the first magneto-optical recording medium in accordance with the present invention is characterized by having: (1) a first transparent dielectric layer, (2) a reproduction layer showing in-plane magnetization at room temperature while showing perpendicular magnetization in response to temperature rise, (3) a second transparent dielectric layer, (4) a recording layer made of perpendicular magnetization film; and (5) a protective layer, wherein these layers are laminated on a substrate in this order, and the reproduction layer has a thickness of 5 nm to 30 nm, the second transparent dielectric layer has a thickness of 6 nm to 40 nm, and the recording layer has a thickness of 20 nm to 80 nm.

According to the first magneto-optical recording medium, since the reproduction layer is arranged thin so as to have a thickness of not more than 30 nm, the leakage magnetic field derived from the reproduction layer is small. Further, since the recording and reproduction layers are separated by the second transparent dielectric layer having a thickness of not less than 6 nm, the leakage magnetic field derived from the reproduction layer scarecely affects the characteristics of the recording magnetic field of the recording layer.

Thus, it is possible to obtain a magneto-optical recording medium (1) which can be reproduced even when recording operation is carried out with respect to a smaller diameter of recording bits having a smaller spacing therebetween and (2) which can be recorded or erased by a smaller magnetic field.

The second magneto-optical recording medium of the present invention is characterized, in the first magneto-optical recording medium, by that (1) the recording layer has a compensation temperature $T_{wcomp}$ of not more than 50° C. or (2) the recording layer has transition metal sub-lattice moment which is always greater than that of rare earth metal sub-lattice moment in a temperature range of room temperature to Curie temperature $T_{wc}$ of the recording layer.

According to the second magneto-optical recording medium, in the first magneto-optical recording medium, since the temperature dependence of the leakage magnetic field derived from the recording layer is optimized with respect to the reproduction characteristics, it is possible to obtain sufficient quality of signal even when recording operation is carried out with respect to a smaller diameter of recording bits having a smaller spacing therebetween.

The third magneto-optical recording medium of the present invention is characterized, in the first magneto-optical recording medium, by that (1) the reproduction layer has a compensation temperature $T_{rcomp}$ of not less than 180° C. or (2) the reproduction layer has rare earth metal sub-lattice moment which is always greater than that of transition metal sub-lattice moment in a temperature range of room temperature to Curie temperature $T_{rc}$ of the reproduction layer.

According to the third magneto-optical recording medium, in the first magneto-optical recording medium, since the leakage magnetic field derived from the reproduction layer becomes reduced during recording operation, it is possible to obtain a magneto-optical recording medium which can carry out recording and erasure operations with a smaller magnetic field.

The fourth magneto-optical recording medium of the present invention is characterized, in the first magneto-optical recording medium, by further having a recording assistance layer, provided to be adjacent to the recording layer, wherein said recording assistance layer and said recording layer have a total thickness of not less than 20 nm.

According to the fourth magneto-optical recording medium, in the first magneto-optical recording medium, since the recording assistance layer has greater sensitivity for a magnetic field than that of the recording layer, it is possible to obtain a magneto-optical recording medium which can carry out recording and erasure operations with a smaller magnetic field.

The fifth magneto-optical recording medium of the present invention is characterized, in the fourth magneto-optical recording medium, by that (1) the recording assistance layer has a compensation temperature of not more than 50° C. or (2) the recording assistance layer has transition metal sub-lattice moment which is always greater than that of rare earth metal sub-lattice moment in a temperature range of room temperature to Curie temperature of said recording assistance layer.

According to the fifth magneto-optical recording medium, in the fourth magneto-optical recording medium, since the magnetic characteristics of the recording assistance layer are optimized, it is possible to obtain a magneto-optical recording medium which can be recorded by a practical recording magnetic field.

The sixth magneto-optical recording medium of the present invention is characterized, in the fourth magneto-optical recording medium, by that the recording assistance layer is provided between the second transparent dielectric layer and the recording layer.

According to the sixth magneto-optical recording medium, in the fourth magneto-optical recording medium, since the magnetic characteristics of the recording assistance layer are optimized, it is possible to obtain a magneto-optical recording medium which can be recorded by a practical recording magnetic field. Further, the laser light passed through the reproduction layer is reflected by the recording assistance layer whose Kerr rotation angle is greater than that of the recording layer. Accordingly, it is possible to obtain a reproduction signal greater than that obtained by the arrangement wherein the recording layer itself is used as the reflecting layer.

The first method for reproducing from the first magneto-optical recording medium in accordance with the present invention is characterized by having the step of projecting laser light having intensity smaller than that by which an abrupt change occurs in a reproduction signal due to disappearance (collapse) of magnetic domains of said reproduction layer.

According to the first method, since the waveform of the reproduction signal changes in a sinusoidal manner in accordance with recording magnetic domains like the conventional method, it is possible to reproduce information which was recorded in accordance with a mark-edge recording that ensures a high density recording.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. The present invention will become more fully understood from the detailed description given hereinbelow and the accompanying drawings which are given by way of illustration only, and thus, are not limitative of the present invention.

DETAILED DESCRIPTION OF THE PREFERRED EMBODIMENTS

[First Embodiment]

The following description deals with one embodiment of the present invention. The present embodiment deals with the case where a magneto-optical disk is adopted as a magneto-optical recording medium.

Figure 1:
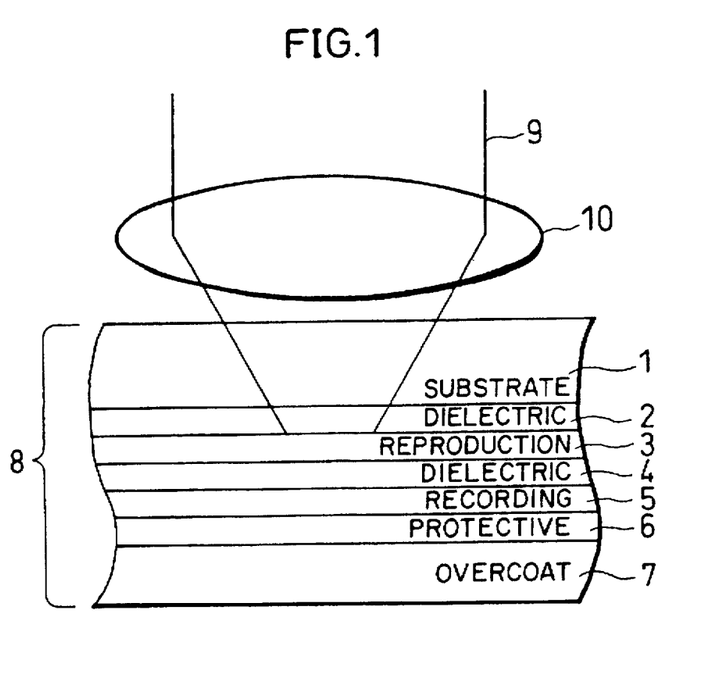
FIG. 1 is a schematic explanatory diagram showing a structure of a magneto-optical disk in accordance with the present invention.

The magneto-optical disk of the present embodiment has a disk main body 8 wherein a substrate 1, a first transparent dielectric layer 2, a reproduction layer 3, a second transparent dielectric layer 4, a recording layer 5, a protective layer 6, and an overcoat layer 7 are laminated in this order (see FIG. 1).

Information is recorded with respect to the magneto-optical disk in accordance with the Curie temperature recording method, i.e., information is recorded and reproduced to and from the magneto-optical disk using the magneto-optical effect, which is known as the magneto-optical Kerr effect (hereinafter referred to as Kerr effect), while converging a light beam 9 projected from a semiconductor laser onto the reproduction layer 3 through an objective lens 10. The Kerr effect indicates a phenomenon in which the rotation direction of the polarization plane of reflected light is reversed by the magnetization direction orthogonal to the plane of incident light.

The substrate 1 is made of a transparent material such as polycarbonate and has a disk shape. The reproduction layer 3 is a magnetic film which is made of rare earth-transition metal alloy, and the composition of the substrate 1 is adjusted so as to have the following magnetic characteristics. More specifically, the reproduction layer 3 shows in-plane magnetization at room temperature while shows perpendicular magnetization in response to temperature rise. The reproduction layer 3 is designed so as to have a thickness falling within a range of 5 nm to 30 nm. The second transparent dielectric layer 4 is made of a dielectric substance such as AlN or SiN. The second transparent dielectric layer 4 is designed so as to have a thickness falling within a range of 6 nm to 40 nm. The recording layer 5 is a perpendicular magnetization film which is made of rare earth-transition metal alloy. The recording layer 5 is designed so as to have a thickness falling within a range of 20 nm to 80 nm.

The reproduction layer 3 is statically magnetic-coupled to the recording layer 5. Accordingly, the magnetization direction of the reproduction layer 3 tries to direct to the same direction as that of the recording layer 5. In contrast, the portion, which shows in-plane magnetization, i.e., has no temperature rise, of the reproduction layer 3 does not show the Kerr effect. Accordingly, information can be reproduced only from the portion, which shows perpendicular magnetization, i.e., has temperature rise due to the reproduction-use laser light projection, of the reproduction layer 3. Therefore, it is possible to reproduce information from the recording magnetic domain which has been recorded at a spacing of smaller than the light beam spot.

The first transparent dielectric layer 2 necessitates a thickness by which good interference effect is realized with respect to the incident laser light so as to enhance Kerr rotation angles of the magneto-optical disk. More specifically, the thickness of the first transparent dielectric layer 2 is set to about ($\lambda/4n$), where $\lambda$ indicates the wavelength of the laser light and "n" indicates the refractive index of the first transparent dielectric layer 2. For example, when $\lambda$ is 680 nm, the thickness of the first transparent dielectric layer 2 is set to about 40 nm to 100 nm.

<Example 1>

(1) Method for manufacturing magneto-optical disk

The following description deals with how to manufacture magneto-optical disks each having the foregoing arrangement.

First, a substrate 1, which is made of polycarbonate, has a disk shape, and has pregrooves and prepits, was arranged in a substrate holder in a sputtering apparatus. The sputtering apparatus was provided with Al target, GdFeCo alloy target, and TbDyFeCo alloy target, respectively. The sputtering apparatus was evacuated up to $1\times10^{-6}$ Torr. Then, the mixed gas of argon and nitrogen was introduced into the evacuated sputtering apparatus. A first transparent dielectric layer 2, made of AlN, having a thickness of 80 nm was formed on the substrate 1 under the condition where a gas pressure of $4\times10^{-3}$ Torr was kept, while applying the electric power to the Al target.

Then, the sputtering apparatus was evacuated again up to $1\times10^{-6}$ Torr. Thereafter, argon gas was introduced. A reproduction layer 3, made of $Gd_{0.31}(Fe_{0.78} Co_{0.22})_{0.69}$, having a thickness of 20 nm was formed on the first transparent dielectric layer 2 under the condition where a gas pressure of $4\times10^{-3}$ Torr was kept, while applying the electric power to the GdFeCo alloy target. The reproduction layer 3 had the following magnetic characteristics. More specifically, the reproduction layer 3 (1) showed in-plane magnetization at room temperature while perpendicular magnetization at 120° C., (2) had a compensation temperature of 300° C. and a Curie temperature of 360° C.

Then, the mixed gas of argon and nitrogen was introduced into the sputtering apparatus. A second transparent dielectric layer 4, made of AlN, having a thickness of 20 nm was formed on the reproduction layer 3 under the condition where a gas pressure of $4\times10^{-3}$ Torr was kept, while applying the electric power to the Al target.

Next, the sputtering apparatus was evacuated again up to $1\times10^{-6}$ Torr. Thereafter, argon gas was introduced. A recording layer 5, made of $(Tb_{0.75} Dy_{0.25})_{0.30}(Fe_{0.72} Co_{0.28})_{0.70}$, having a thickness of 40 nm was formed on the second transparent dielectric layer 4 under the condition where a gas pressure of $4\times10^{-3}$ Torr was kept, while applying the electric power to the TbDyFeCo alloy target. The recording layer 5 had a compensation temperature of 25° C. and a Curie temperature of 275° C.

Then, the mixed gas of argon and nitrogen was introduced into the sputtering apparatus. A protective layer 6, made of AlN was formed on the recording layer 5 under the condition where a gas pressure of $4\times10^{-3}$ Torr was kept, while applying the electric power to the Al target. Note that the thickness of the protective layer 6 is not restricted to a specific one provided that the recording layer 5 can be protected from corrosion due to such as oxidation. It is preferable that the protective layer 6 has a thickness of not less than 5 nm. According to the present embodiment, the protective layer 6 was set to have a thickness of 20 nm.

Ultraviolet rays hardening resin or thermally hardening resin was applied on the protective layer 6 by the spin coat method. Then, ultraviolet rays or heat was applied to the resin so as to form an overcoat layer 7.

(2) Characteristics of recording and reproduction

Figure 2:
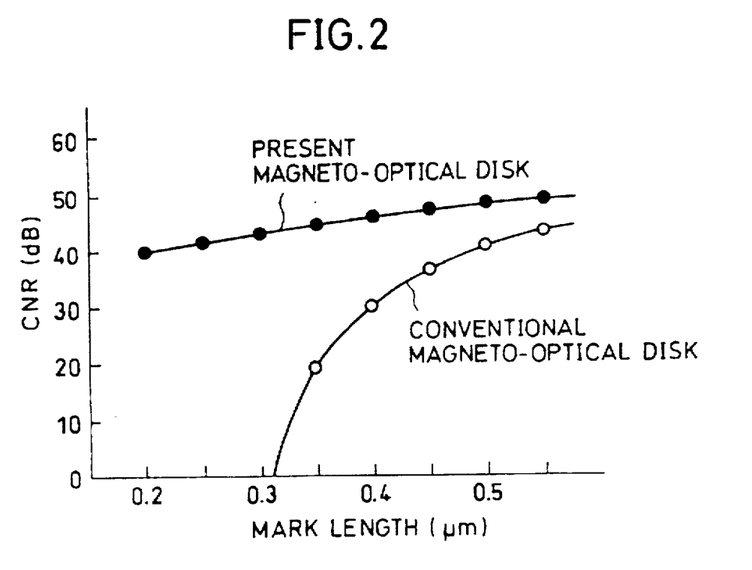
FIG. 2 is a graph showing comparison of respective reproduction characteristics of the magneto-optical disk shown in FIG. 1 and a conventional magneto-optical disk.

CNR (signal to noise ratio) of the foregoing magneto-optical disk was measured with the use of an optical pickup having a semiconductor laser whose wavelength was 680 nm. FIG. 2 shows the mark length dependence of the measured CNR.

Figure 3:
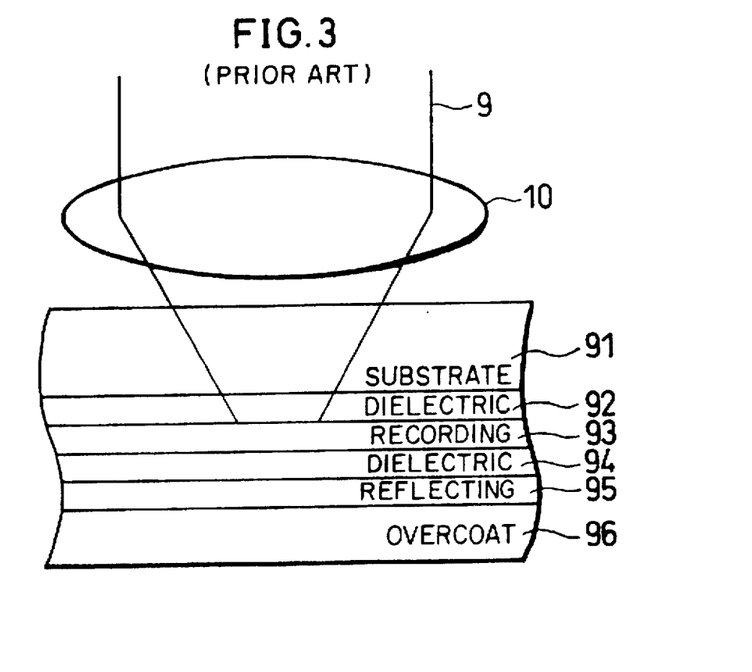
FIG. 3 is a schematic explanatory diagram showing a structure of a conventional magneto-optical disk.

FIG. 2 also shows, for comparison, the mark length dependence of the CNR which was measured for a magneto-optical disk that has been commercially available. Note that such a commercially available magneto-optical disk is arranged so that a substrate 91, a first dielectric layer 92, a recording layer 93, a second dielectric layer 94, a reflecting layer 95, and an overcoat layer 96 are laminated in this order (see FIG. 3).

According to the present embodiment, CNR was measured with the use of an optical pickup having a semiconductor laser whose wavelength was 680 nm. In the case where a series of recording magnetic domains are ordinarily recorded to the commercially available magneto-optical disk with a mark length of 0.3 μm and a mark spacing of 0.6 μm, it is most likely that a plurality of recording magnetic domains coexist in a single laser beam spot, thereby making it hard to separately reproduce each individual recording magnetic domain. Therefore, CNR of zero was measured for the commercially available magneto-optical disk for a mark length of 0.3 μm.

In contrast, according to a magneto-optical disk of the present embodiment, information can be reproduced only from the portion, which shows perpendicular magnetization in response to the temperature rise due to the reproduction-use laser light projection thereonto, of the reproduction layer 3, thereby resulting in that CNR of 41 dB was obtained even when a mark length was 0.3 μm.

In a conventional magneto-optical recording medium wherein the recording layer is statically magnetic-coupled to the reproduction layer, the non-magnetic intermediate layer (corresponding to the second transparent dielectric layer 4 of the present embodiment) provided between the two layers has a thin thickness of 5 nm as disclosed in Japanese unexamined patent publication No. 6-150418/1994. The farther the position is away from the recording layer, the smaller the leakage magnetic field, on the position, derived from the recording layer becomes. Accordingly, the non-magnetic intermediate layer having such a thin thickness is formed, i.e., the spacing between the recording layer and the reproduction layer is provided to be small so that the reproduction layer and the recording layer are fully statically magnetic-coupled by the leakage magnetic field from the recording layer. In contrast, according to the present embodiment, as shown in FIG. 2, even when the second transparent dielectric layer 4 has a thickness of 20 nm, good super-resoluble reproduction characteristics were obtained.

Table 1 shows the results of measured CNR with a mark length of 0.45 μm by varying the respective thicknesses of the reproduction layer 3 and the recording layer 5 of the present embodiment.

TABLE 1

| REPRODUCTION LAYER THICKNESS (μm) | RECORDING LAYER THICKNESS (μm) | CNR (dB) | ERASURE MAGNETIC FIELD (kA/m) |
|---|---|---|---|
| 0 | 40 | 36 | 20 |
| 3 | 40 | 35 | 20 |
| 5 | 40 | 41 | 20 |
| 10 | 40 | 43 | 20 |
| 15 | 40 | 45 | 20 |
| 20 | 40 | 47 | 20 |
| 25 | 40 | 47 | 22 |
| 30 | 40 | 45 | 31 |
| 35 | 40 | 40 | 40 |
| 40 | 40 | 40 | 51 |
| 20 | 10 | 0 | — |
| 20 | 20 | 30 | 12 |
| 20 | 30 | 44 | 17 |
| 20 | 40 | 47 | 20 |
| 20 | 60 | 47 | 25 |
| 20 | 80 | 47 | 29 |
| 20 | 100 | 47 | 39 |

In Table 1, 0 nm (the thickness of the reproduction layer) indicates that a second interference layer (corresponding to the second transparent dielectric layer 4 of the present embodiment) was directly formed on a first interference layer (corresponding to the first transparent dielectric layer 2 of the present embodiment) without the reproduction layer 3. Accordingly, in such a case, the measured result indicates the recording characteristics and reproduction characteristics without the reproduction layer 3. As is clear from Table 1, when the reproduction layer 3 had a thickness of 3 nm, the measured CNR was smaller than that of the case having no such a reproduction layer 3. In such a case, no improvement was found in the reproduction characteristics. This is because the thickness of the reproduction layer 3 was too thin to realize the magnetic characteristics, i.e., to show in-plane magnetization at room temperature while show perpendicular magnetization in response to temperature rise. In order to obtain a suitable CNR, it is necessary for the reproduction layer 3 to have a thickness of not less than 5 nm. When the reproduction layer 3 had a thickness of not less than 35 nm, an abrupt rise was found in the magnetic field for erasing of the recorded information (hereinafter referred to as the erasure magnetic field). Therefore, it is necessary to apply the erasure magnetic field of not less than 40 kA/m, thereby causing the erasure magnetic field generating apparatus to become bulky and causing the dissipated power to increase. When currently available magneto-optical disk drive is used, it is necessary for a reproduction layer to have a thickness of not more than 30 nm in order to realize or obtain a practical erasure magnetic field.

As is clear from Table 1, when the reproduction layer 3 had a thickness of 20 nm and the recording layer 5 had a thickness of 10 nm, no reproduction signal was obtained. The magnetization of the reproduction layer 3 is directed by the leakage magnetic field from the recording layer 5. Accordingly, when the recording layer 5 becomes thinner so that the leakage magnetic field from the recording layer 5 is reduced, it becomes impossible to reproduce the recorded information. As is clear from Table 1, according to the present embodiment, it is necessary for the recording layer 5 to have a thickness of not less than 20 nm.

When judging only from the reproduction characteristics (CNR), the thickness of the recording layer 5 has no upper limit. However, when the thickness of the recording layer 5 is too thick, a greater erasure magnetic field is necessary. In order to generate an erasure magnetic field of more than 31 kA/m, a bulky magnetic field generating apparatus is necessary, thereby causing a magneto-optical recording and reproduction apparatus to become bulky. In order to generate a practical erasure magnetic field (not more than 31 kA/m), it is necessary for the recording layer 5 to have a thickness of not more than 80 nm.

Table 2 shows measured results of CNR and erasure magnetic field with a mark length of 0.45 μm by changing the thickness of the second transparent dielectric layer 4 of the Example 1.

TABLE 2

| THICKNESS OF SECOND TRANSPARENT DIELECTRIC LAYER (μm) | CNR (dB) | ERASURE MAGNETIC FIELD (kA/m) |
|---|---|---|
| 3 | 47.5 | 53 |
| 4 | 47.0 | 48 |
| 5 | 47.5 | 41 |
| 6 | 48.0 | 30 |
| 7 | 48.5 | 22 |
| 8 | 47.5 | 20 |
| 10 | 47.0 | 20 |
| 15 | 48.0 | 20 |
| 20 | 47.0 | 20 |
| 30 | 46.5 | 20 |
| 40 | 45.5 | 20 |
| 50 | 41.0 | 20 |

As is clear from Table 2, when the second transparent dielectric layer 4 had a thickness of not more than 5 nm, an abrupt arise was found in the erasure magnetic field. This is because the erasure magnetic field was increased based on the fact that the second transparent dielectric layer 4 became thin and the reproduction layer 3 became closer to the recording layer 5 so that the leakage magnetic field from the reproduction layer 3 greatly affected the recording layer 5.

As is clear from Table 2, when the second transparent dielectric layer 4 had a thickness of not less than 8 nm, a constant erasure magnetic field of 20 kA/m was obtained. This is based on the fact that the leakage magnetic field from the reproduction layer 3 did not affect the recording characteristics at all and the erasure magnetic field was determined only by the recording characteristics of the recording layer 5.

The increase of the erasure magnetic field causes the magnetic generating apparatus in the magneto-optical disk drive to become bulky and causes the dissipated power to increase. Since an erasure magnetic field of not more than 31 kA/m is required for currently available magneto-optical disk drives, it is clear from Table 2 that a thickness of not less than 6 nm is required for the second transparent dielectric layer 4.

During the reproduction operation, the magnetization direction of the reproduction layer 3 is determined by the leakage magnetic field derived from the recording layer 5. Accordingly, as is clear from Table 2, when the second transparent dielectric layer 4 had a thicness of 50 nm, the leakage magnetic field derived from the recording layer 5 did not fully arrive at the reproduction layer 3, thereby causing CNR to deteriorate. In order to ensure a good signal quality, i.e., a great CNR, it is necessary for the second transparent dielectric layer 4 to have a thicness of not more than 40 nm.

<Example 2>

Figure 4:
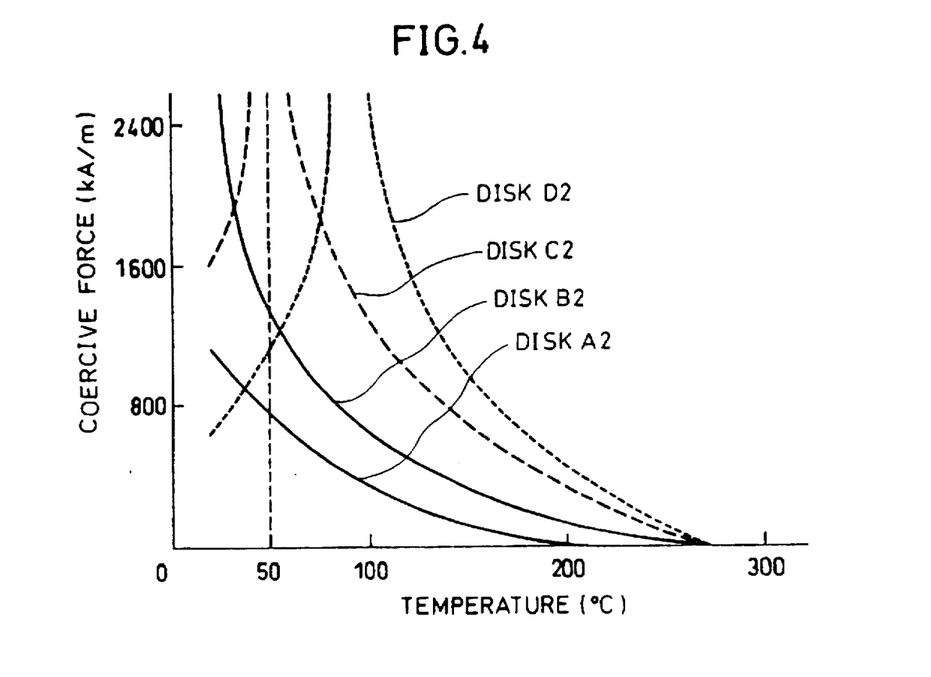
FIG. 4 is a graph showing magnetic characteristics of the recording layer of the magneto-optical disk shown in FIG. 1.
Figure 5:
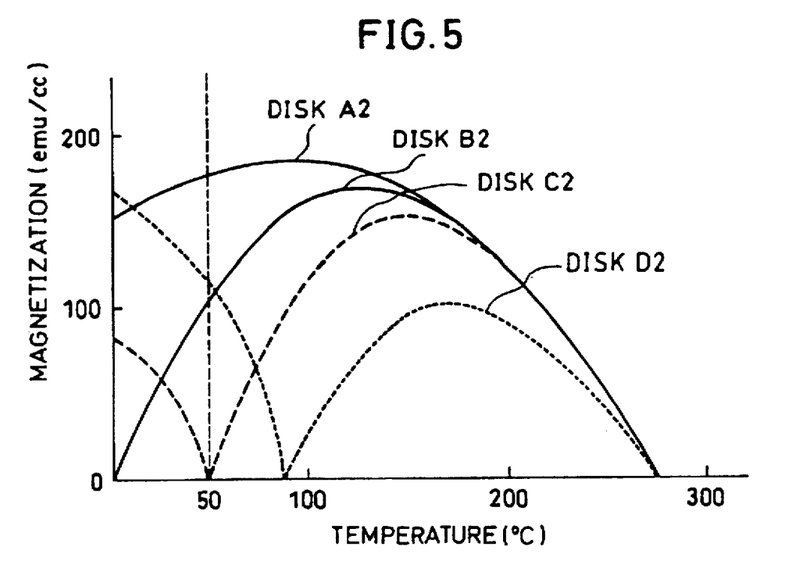
FIG. 5 is another graph showing magnetic characteristics of the recording layer of the magneto-optical disk shown in FIG. 1.

A plurality of magneto-optical disks in accordance with the present example were prepared by changing only the composition of the recording layer 5 of the foregoing Example 1, and recording characteristics and reproduction characteristics were measured for each disk. Table 3 shows each composition, compensation temperature, and Curie temperature of such prepared magneto-optical disks. FIGS. 4 and 5 show a temperature dependence of the coercive force and a temperature dependence of the magnetization of the recording layer 5, respectively. Note that the dimension of the temperature is °C.

TABLE 3

| DISK | COMPOSITION | COMPENSATION TEMP. | CURIE TEMP. |
|---|---|---|---|
| A2 | $(Tb_{0.75}Dy_{0.25})_{0.22}(Fe_{0.72}Co_{0.28})_{0.78}$ | — | 275 |
| B2 | $(Tb_{0.75}Dy_{0.25})_{0.30}(Fe_{0.72}Co_{0.28})_{0.70}$ | 25 | 275 |
| C2 | $(Tb_{0.75}Dy_{0.25})_{0.32}(Fe_{0.72}Co_{0.28})_{0.68}$ | 50 | 275 |
| D2 | $(Tb_{0.75}Dy_{0.25})_{0.34}(Fe_{0.72}Co_{0.28})_{0.66}$ | 90 | 275 |

TABLE 4

| DISK | CNR (dB) | ERASURE MAGNETIC FIELD (kA/m) |
|---|---|---|
| A2 | 48 | 24 |
| B2 | 47 | 20 |
| C2 | 45 | 17 |
| D2 | 20 | 15 |

As the foregoing Example 1, each CNR of the magneto-optical disks A2, B2, C2, and D2 prepared as above were measured, with a mark length of 0.45 μm and optimum reproduction conditions, by an optical pickup having a semiconductor laser whose wavelength was 680 nm. The measured results are shown in Table 4.

When comparing the respective reproduction characteristics of the magneto-optical disks A2, B2, C2, and D2 with each other, good CNRs were obtained for the magneto-optical disks A2, B2, and C2, while a small CNR of 20 dB was obtained for the magneto-optical disk D2. These results are clear from the respective magnetic characteristics (see FIGS. 4 and 5) of the foregoing magneto-optical disks. The magnetization direction of the reproduction layer 3 of a magneto-optical disk in accordance with the present embodiment is determined by the leakage magnetic field derived from the recording layer 5. Accordingly, when the leakage magnetic field derived from the recording layer 5 becomes small, it is not possible to reproduce the recorded imformation. The leakage magnetic field derived from the recording layer 5 changes in proportion to magnitude of magnetization of the recording layer 5. It is therefore necessary, at temperatures of about 100° C. to 150° C., for the recording layer 5 to have sufficient great magnitude of magnetization so as to generate a sufficient great leakage magnetic field. Note that, at temperatures of about 100° C. to 150° C., the transition occurs in the reproduction layer 3 from in-plane magnetization to perpendicular magnetization.

As is clear from FIG. 5, the respective compensation temperatures of the recording layer 5 of the magneto-optical disks A2, B2, and C2 depart from such temperatures of about 100° C. to 150° C. at which the transition occurs in the reproduction layer 3 from in-plane magnetization to perpendicular magnetization. Accordingly, the recording layer 5 has such sufficient great magnitude of magnetization so as to generate such a sufficient great leakage magnetic field. In contrast, the compensation temperature of the recording layer 5 of the magneto-optical disk D2 is close to such temperatures of about 100° C. to 150° C. at which the transition occurs in the reproduction layer 3 from in-plane magnetization to perpendicular magnetization. Accordingly, the recording layer 5 has too small magnetiztion to generate a leakage magnetic field required for the reproduction operation.

In view of the foregoing facts, the recording layer 5 is set to have the following magnetic characteristics. More specifically, according to the recording layer 5, (1) the compensation temperature is not more than 50° C. like the magneto-optical disk B2 or C2, or (2) the transition metal sub-lattice moment is always greater than that of the rare earth metal sub-lattice moment like the magneto-optical disk A2 in a temperature range of room temperature to its Curie temperature $T_{WC}$.

<Example 3>

Figure 6:
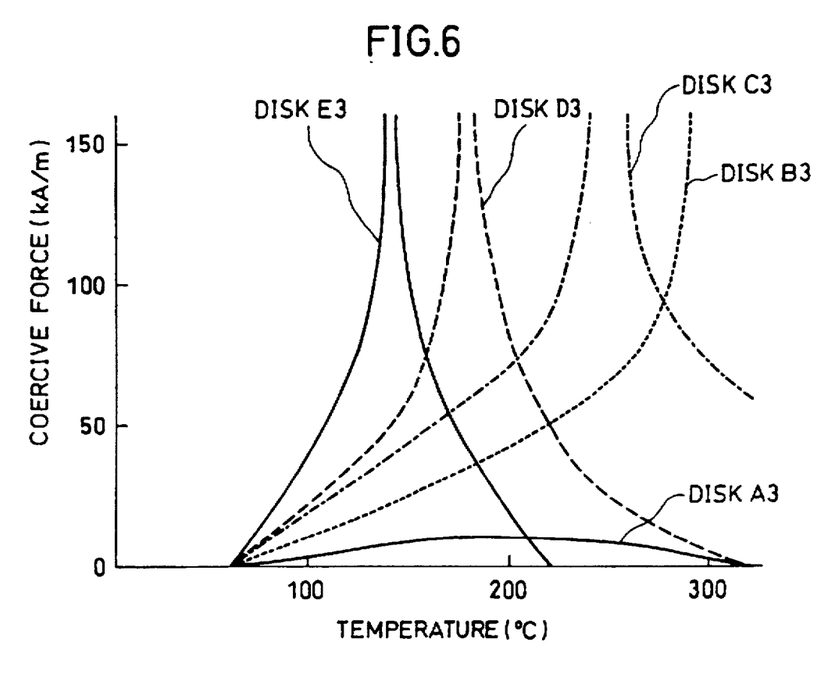
FIG. 6 is a graph showing magnetic characteristics of the reproduction layer of the magneto-optical disk shown in FIG. 1.
Figure 7:
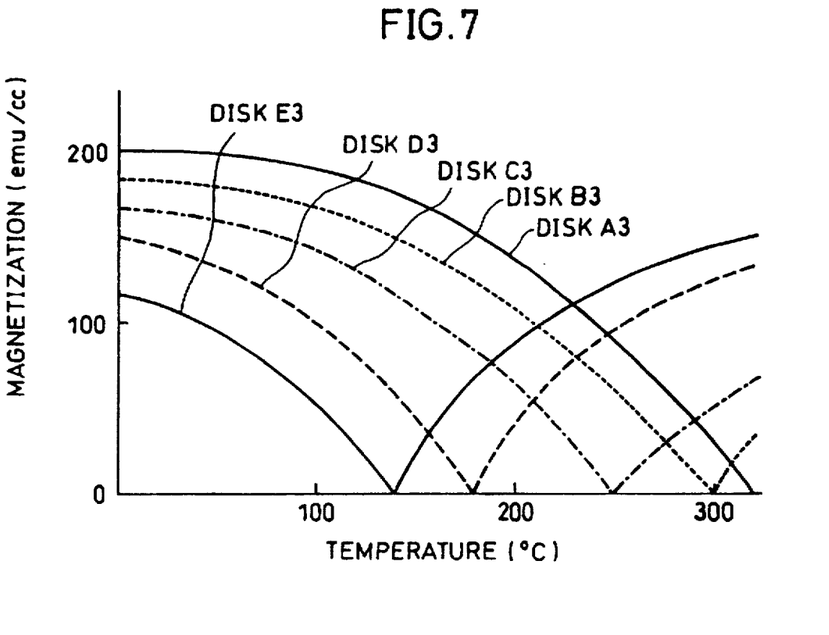
FIG. 7 is another graph showing magnetic characteristics of the reproduction layer of the magneto-optical disk shown in FIG. 1.

A plurality of magneto-optical disks in accordance with the present example were prepared by changing only the composition of the reproduction layer 3 of the foregoing Example 1, and recording characteristics and reproduction characteristics were measured for each disk. Table 5 shows each composition, compensation temperature, and Curie temperature of such prepared magneto-optical disks. FIGS. 6 and 7 show a temperature dependence of the coercive force and a temperature dependence of the magnetization of the reproduction layer 3, respectively. Note that the dimension of the temperature is °C.

TABLE 5

| DISK | COMPOSITION | COMPENSATION TEMP. | CURIE TEMP. |
|---|---|---|---|
| A3 | $Gd_{0.31}(Fe_{0.82}Co_{0.18})_{0.69}$ | — | 320 |
| B3 | $Gd_{0.31}(Fe_{0.78}Co_{0.22})_{0.69}$ | 300 | 360 |
| C3 | $Gd_{0.31}(Fe_{0.72}Co_{0.28})_{0.69}$ | 250 | 380 |
| D3 | $Gd_{0.31}(Fe_{0.63}Co_{0.37})_{0.69}$ | 180 | 400 |
| E3 | $Gd_{0.31}(Fe_{0.60}Co_{0.40})_{0.69}$ | 140 | 420 |

TABLE 6

| DISK | CNR (dB) | ERASURE MAGNETIC FIELD (kA/m) |
|---|---|---|
| A3 | 45 | 20 |
| B3 | 47 | 17 |
| C3 | 47 | 20 |
| D3 | 45 | 24 |
| E3 | 30 | 40 |

As the foregoing Example 1, each CNR of the magneto-optical disks A3, B3, C3, D3, and E3 prepared as above were measured, with a mark length of 0.45 μm and optimum reproduction conditions, by an optical pickup having a semiconductor laser whose wavelength was 680 nm. The measured results are shown in Table 6.

When comparing the respective reproduction characteristics of the magneto-optical disks A3, B3, C3, D3, and E3 with each other, good CNRs were obtained for the magneto-optical disks A3, B3, C3, and D3, while a small CNR of 30 dB was obtained for the magneto-optical disk E3. These results are clear from the respective magnetic characteristics (see FIGS. 6 and 7) of the foregoing magneto-optical disks. The magnetization direction of the reproduction layer 3 of the present embodiment is determined by the leakage magnetic field derived from the recording layer 5. Accordingly, when the magnetization direction of the reproduction layer 3 becomes small, it is not possible to reproduce the recorded imformation because the leakage magnetic field derived from the recording layer 5 is weakly statically magnetic-coupled to the reproduction layer 3. It is therefore necessary, at temperatures of about 100° C. to 150° C., for the reproduction layer 3 to have sufficient great magnitude of magnetization so as to fully statically magnetic-coupled to the leakage magnetic field derived from the recording layer 5. Note that, at temperatures of about 100° C. to 150° C., the transition occurs in the reproduction layer 3 from in-plane magnetization to perpendicular magnetization.

As is clear from FIG. 7, the respective compensation temperatures of the reproduction layer 3 of the magneto-optical disks A3, B3, C3, and D3 depart from such temperatures of about 100° C. to 150° C. at which the transition occurs in the reproduction layer 3 from in-plane magnetization to perpendicular magnetization. Accordingly, the reproduction layer 3 has sufficiently great magnitude of magnetization so as to fully statically magnetic-coupled to the leakage magnetic field derived from the recording layer 5. In contrast, the compensation temperature of the reproduction layer 3 of the magneto-optical disk E3 is close to such temperatures of about 100° C. to 150° C. at which the transition occurs in the reproduction layer 3 from in-plane magnetization to perpendicular magnetization. Accordingly, the reproduction layer 3 has too small magnetiztion to fully statically magnetic-coupled to the leakage magnetic field derived from the recording layer 5.

In addition, the reproduction layer 3 of the magneto-optical disk E3 has greater magnitude of magnetization at about 275° C. (Curie temperature of the recording layer 5) as compared to the magneto-optical disks A3, B3, C3, and D3. Accordingly, since the leakage magnetic field derived from the reproduction layer 3 significantly affects the recording characteristics and the erasure characteristics, it becomes necessary to apply greater erasure magnetic field as shown in Table 6.

In view of the foregoing facts, the reproduction layer 3 is set to have the following magnetic characteristics. More specifically, according to the reproduction layer 3, (1) it shows in-plane magnetization at room temperature while shows perpendicular magnetization in response to temperature rise and has a compensation temperature of not less than 180° C. like the magneto-optical disks B3, C3 and D3, or (2) the rare earth metal sub-lattice moment is always greater than that of the transition metal sub-lattice moment like the magneto-optical disk A3 in a temperature range of room temperature to its Curie temperature $T_{rc}$.

<Example 4>

Figure 8:
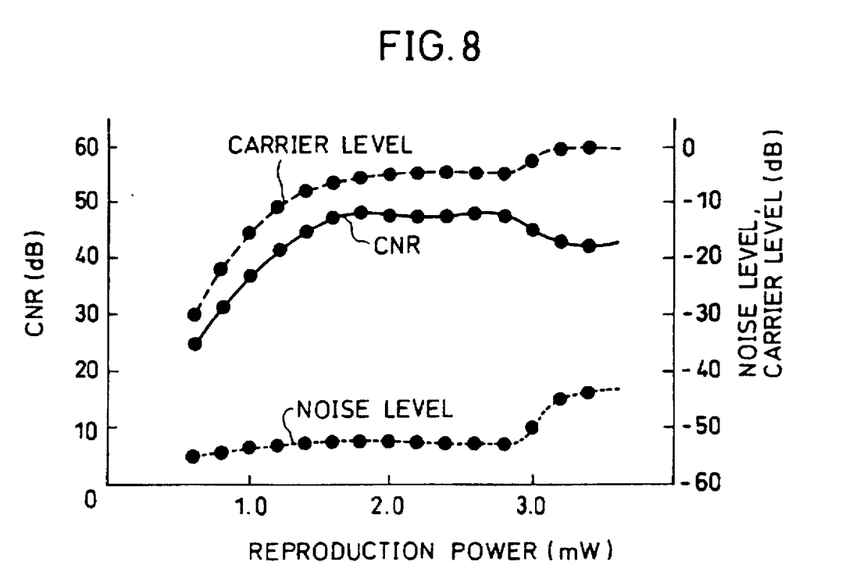
FIG. 8 is a graph showing reproduction characteristics of the magneto-optical disk shown in FIG. 1.

FIG. 8 shows respective reproduction power dependences of a carrier level and a noise level of a magneto-optical disk C3 of the Example 3 in which (1) a reproduction layer 3 has a compensation temperature of 250° C., a Curie temperature of 380° C., and a composition of $Gd_{0.31}(Fe_{0.72} Co_{0.28})_{0.69}$, and (2) a recording layer 5 has a compensation temperature of 25° C., a Curie temperature of 275° C., and a composition of $(Tb_{0.75} Dy_{0.25})_{0.30} (Fe_{0.72}Co_{0.28})_{0.70}$.

The reproduction layer of a magneto-optical recording medium in accordance with the present embodiment shows in-plane magnetization at room temperature while shows perpendicular magnetization in response to temperature rise. Accordingly, an output of the reproduction signal (carrier level) gradually increases as the temperature of the reproduction layer 3 rises in response to the change in the reproduction-use laser power from 0.6 mW to 1.8 mW. When the reproduction-use laser power is not less than 1.8 mW, the portion, involved in the reproduction operation, of the reproduction layer shows perpendicular magnetization, so that the carrier level is saturated.

As is clear from FIG. 8, a further increase in the carrier level was observed at a reproduction-use laser power of not less than 2.8 mW. Note that the rise of the noise level was observed for such a reproduction-use laser power, thereby presenting the problem that CNR was substantially reduced.

Figure 9A:
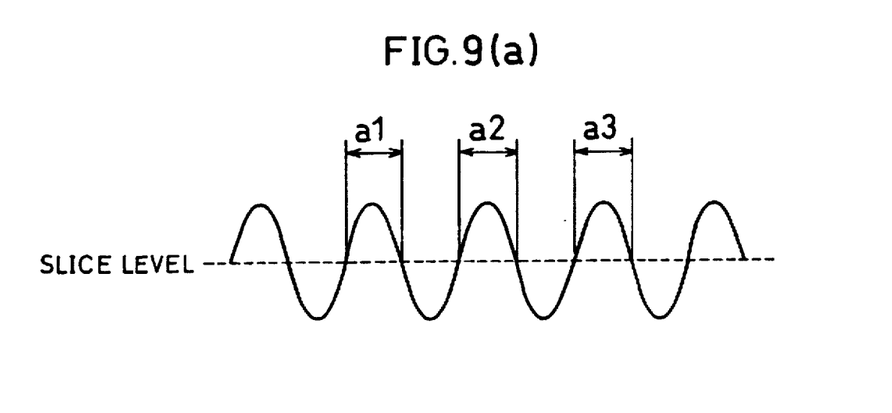
FIGS. 9(a) and 9(b) are graphs each showing the waveform of a reproduction signal of the magneto-optical disk shown in FIG. 1.
Figure 9B:
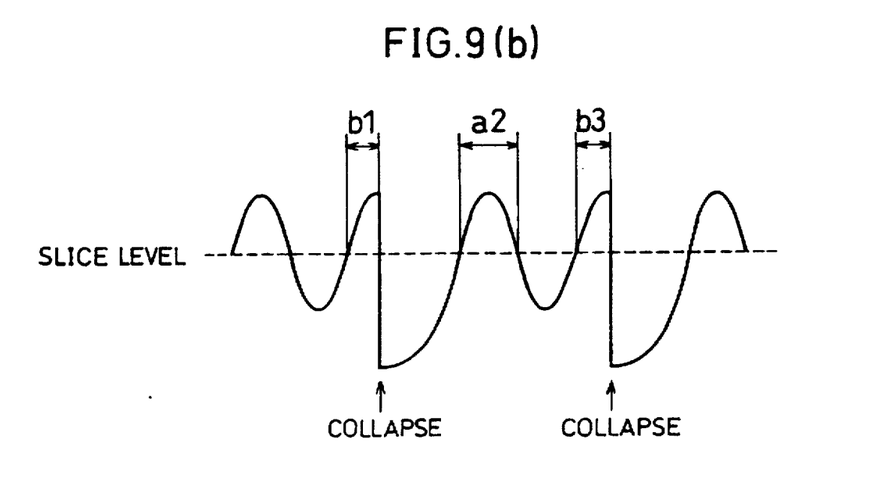

FIGS. 9(a) and 9(b) show respective reproduction waveforms of a reproduction-use laser powers of 2.5 mW and 3.2 mW. As shown in FIG. 9(a), the waveform of the reproduction signal changes in a sinusoidal manner in accordance with recording magnetic domains. Therefore, when a suitable slice level is set, it is possible to reproduce each length of the recording magnetic domains as the recorded information.

In contrast, as shown in FIG. 9(b), an abrupt fall was irregularly found in the reproduction signal. This is because of the following facts. More specifically, the temperature of the reproduction layer 3 gets close to its compensation temperature and the magnetization of the reproduction layer 3 is reduced so that the static magnetic-coupling between the reproduction layer 3 and the recording layer 5 becomes weak, thereby resulting in that the magnetic domain which has been copied from the recording layer 5 to the reproduction layer 3 is instantaneously disappeared (collapsed). In such a case, the carrier level rises in response to the great change in the magnitude of the reproduction signal due to such a collapse. Since this kind of collapse irregularly occurs, the noise level simultaneously rises accordingly, thereby causing CNR to deteriorate.

It is assumed that the respective original lengths of the recording magnetic domains are a1, a2, and a3 as shown in FIG. 9(a). When the collapse occurs as shown in FIG. 9(b), the lengths a1 and a3 are detected as the respective recording magnetic domains b1 and b3 whose lengths of the recording magnetic domains are different from those of a1 and a3, respectively. Accordingly, it becomes difficult to reproduce each length of the recording magnetic domains as the recorded information.

In view of the foregoing facts, the laser light intensity for reproducing the magneto-optical disks of the present embodiment is set to be smaller than that by which an abrupt change is found in the reproduction signal because of the disappearance (collapse) of the recording magnetic domains of the reproduction layer 3.

[Second Embodiment]

Figure 10:
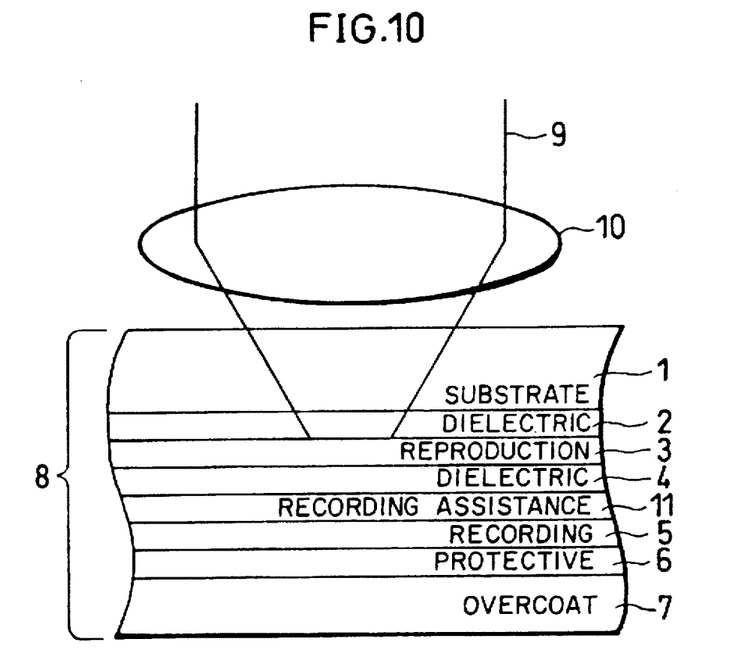
FIG. 10 is another schematic explanatory diagram showing a structure of another magneto-optical disk in accordance with the present invention.
Figure 11:
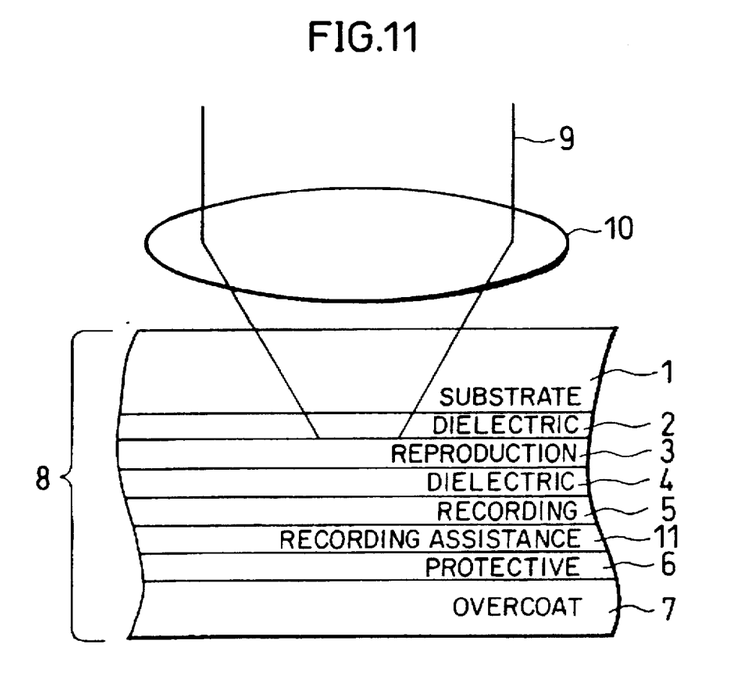
FIG. 11 is a further schematic explanatory diagram showing a structure of a further magneto-optical disk in accordance with the present invention.

The following description deals with another embodiment of the present invention with reference to FIGS. 10 and 11. The present embodiment deals with a case where a magneto-optical disk is adopted as a magneto-optical recording medium.

The magneto-optical disk of the present embodiment has a disk main body 8 wherein a substrate 1, a first transparent dielectric layer 2, a reproduction layer 3, a second transparent dielectric layer 4, a recording assistance layer 11, a recording layer 5, a protective layer 6, and an overcoat layer 7 are laminated in this order (see FIG. 10).

Alternatively, the magneto-optical disk of the present embodiment may have a disk main body 8 wherein a substrate 1, a first transparent dielectric layer 2, a reproduction layer 3, a second transparent dielectric layer 4, a recording layer 5, a recording assistance layer 11, a protective layer 6, and an overcoat layer 7 are laminated in this order (see FIG. 11).

Recording and reproduction operations were carried out in a similar manner to the foregoing first embodiment. According to the present second embodiment, the recording assistance layer 11 is provided so as to be adjacent to the recording layer 5, and has a Curie temperature which is higher than that of the recording layer 5, thereby ensuring the improvement in the recording and reproduction operations.

In a particular case, as shown in FIG. 10, where a recording assistance layer 11 is provided between the second transparent dielectric layer 4 and the recording layer 5, the laser light passed through the reproduction layer 3 is reflected by the recording assistance layer 11 whose Curie temperature is higher than that of the recording layer 5, i.e., whose Kerr rotation angle is greater than that of the recording layer 5. Accordingly, it is possible to obtain a reproduction signal of greater than that obtained by the arrangement wherein the recording layer 5 itself is used as the reflecting layer as shown in FIG. 11.

<Example 5>

(1) Method for manufacturing magneto-optical disk

The following description deals with how to manufacture magneto-optical disks having the foregoing arrangement. A method for manufacturing a magneto-optical disk in accordance with the present embodiment is the same one as that described in the foregoing first embodiment except for the added provision of a recording assistance layer 11.

The magneto-optical disk shown in FIG. 10 was provided with a first transparent dielectric layer 2, a reproduction layer 3, and a second transparent dielectric layer 4, thereafter a sputtering apparatus was evacuated up to $1\times10^{-6}$ Torr. Then, argon gas was introduced into the evacuated sputtering apparatus. There was provided a recording assistance layer 11, made of $Gd_{0.24}(Fe_{0.83}Co_{0.17})_{0.76}$ and having a thickness of 20 nm, on the second transparent dielectric layer 4 under the condition where a gas pressure of $4\times10^{-3}$ Torr was kept while applying the electric power to the GdFeCo alloy target. A recording layer 5, a protective layer 6, and an overcoat layer 7 were provided on the recording assistance layer 11 in this order, thereby preparing the magneto-optical disk shown in FIG. 10. The recording assistance layer 11 had a compensation temperature of not more than 25° C. and a Curie temperature of 290° C. For convenience, the magneto-optical disk shown in FIG. 10 is referred to hereinafter as magneto-optical disk A5.

The magneto-optical disk shown in FIG. 11 was provided with a first transparent dielectric layer 2, a reproduction layer 3, a second transparent dielectric layer 4, and a recording layer 5, thereafter the sputtering apparatus was evacuated up to $1\times10^{-6}$ Torr. Then, argon gas was introduced into the evacuated sputtering apparatus. There was provided a recording assistance layer 11, made of $Gd_{0.24}(Fe_{0.83}Co_{0.17})_{0.76}$ and having a thickness of 20 nm, on the recording layer 5 under the condition where a gas pressure of $4\times10^{-3}$ Torr was kept while applying the electric power to the GdFeCo alloy target. A protective layer 6 and an overcoat layer 7 were provided on the recording assistance layer 11, thereby preparing the magneto-optical disk shown in FIG. 11. The recording assistance layer 11 had a compensation temperature of not more than 25° C. and a Curie temperature of 290° C. For convenience, the magneto-optical disk shown in FIG. 11 is referred to hereinafter as magneto-optical disk B5.

(2) Characteristics of recording and reproduction

Table 7 shows (1) CNRs of the foregoing magneto-optical disks A5 and B5 which were measured with use of an optical pickup having a semiconductor laser whose wavelength was 680 nm and (2) erasure magnetic fields required for erasing respective recording magnetic domains. Table 7 also shows, for comparison, the corresponding CNR and erasure magnetic field of the foregoing magneto-optical disk B2.

TABLE 7

| DISK | CNR (dB) | ERASURE MAGNETIC FIELD (kA/m) |
|---|---|---|
| B2 | 47.0 | 20.0 |
| A5 | 48.5 | 7.5 |
| B5 | 47.0 | 7.5 |

As is clear from Table 7, it was observed that an erasure magnetic field of 20.0 kA/m were necessary for the magneto-optical disk B2 of the foregoing first embodiment, while an erasure magnetic field of 7.5 kA/m were suficient for the magneto-optical disks A5 and B5 of the second embodiment. This indicates that the erasure operation was mainly carried out by the recording assistance layer 11 (GdFeCo) whose Curie temperature (290° C.) was higher than that (275° C.) of the recording layer 5 (TbDyFeCo) and in which the reversing of magnetization was more easily made than in the recording layer 5, thereby realizing that the erasure magnetic field was reduced.

When further comparing the magneto-optical disks A5 and B5, as is clear from Table 7, it was found that a CNR was greater in the magneto-optical disk A5 than in the magneto-optical disks B5. In the magneto-optical disk B5, the laser light passed through the reproduction layer 3 was submitted to multiple reflection between the recording layer 5 and the reproduction layer 3. Accordingly, the magneto-optical disk B5 had the same reproduction characteristics as those of the magneto-optical disk B2. In contrast, in the magneto-optical disk A5, the laser light passed through the reproduction layer 3 was submitted to multiple reflection between the recording assistance layer 11 and the reproduction layer 3. Thus, the multiple reflection was made by the recording assistance layer 11, which had a Curie temperature higher than that of the recording layer 5, i.e., which had a Kerr rotation angle greater than that of the recording layer 5, thereby resulting in that the magneto-optical disk A5 showed CNR higher than those of the magneto-optical disks B2 and B5.

Table 8 shows the results of measured CNR with a mark length of 0.45 μm by varying the respective thicknesses of the reproduction layer 3, the recording assistance layer 11, and the recording layer 5 of the magneto-optical disk A5.

TABLE 8

| THICKNESS (nm) | | | | ERASURE |
|---|---|---|---|---|
| REPRO-DUCTION LAYER | RECORDING ASSISTANCE LAYER | RECORDING LAYER | CNR (dB) | MAGNETIC FIELD (kA/m) |
| 0 | 20 | 40 | 40.0 | 7.5 |
| 3 | 20 | 40 | 36.5 | 7.5 |
| 5 | 20 | 40 | 43.0 | 7.5 |
| 10 | 20 | 40 | 45.5 | 7.5 |
| 15 | 20 | 40 | 46.5 | 7.5 |
| 20 | 20 | 40 | 48.5 | 7.5 |
| 25 | 20 | 40 | 48.0 | 9.5 |
| 30 | 20 | 40 | 47.0 | 17.5 |
| 35 | 20 | 40 | 47.5 | 36.5 |
| 40 | 20 | 40 | 46.5 | 47.5 |
| 20 | 5 | 5 | 0.0 | — |
| 20 | 10 | 10 | 32.0 | 7.5 |
| 20 | 20 | 10 | 46.5 | 7.5 |
| 20 | 20 | 20 | 48.5 | 7.5 |
| 20 | 20 | 40 | 48.5 | 7.5 |

TABLE 8-continued

| THICKNESS (nm) | | | | ERASURE |
|---|---|---|---|---|
| REPRO-DUCTION LAYER | RECORDING ASSISTANCE LAYER | RECORDING LAYER | CNR (dB) | MAGNETIC FIELD (kA/m) |
| 20 | 20 | 80 | 48.5 | 7.5 |
| 20 | 20 | 100 | 48.5 | 7.5 |

Table 8. 0 nm (the thickness of the recording layer) indicates that a second interference layer (corresponding to the second transparent dielectric layer 4 of the present embodiment) was directly formed on a first interference layer (corresponding to the first transparent dielectric layer 2 of the present embodiment) without the reproduction layer 3. Accordingly, in such a case, the measured result indicates the recording characteristics and reproduction characteristics without the reproduction layer 3.

As is clear from Table 8, when the reproduction layer 3 had a thickness of 3 nm, the measured CNR was smaller than that of the case having no such a reproduction layer 3. In such a case, no improvement was found in the reproduction characteristics. This is because the thickness of the reproduction layer 3 was too thin to realize the magnetic characteristics, i.e., to show in-plane magnetization at room temperature while show perpendicular magnetization in response to temperature rise. In order to obtain a suitable CNR, it is necessary for the reproduction layer 3 to have a thickness of not less than 5 nm. When the reproduction layer 3 had a thickness of not less than 35 nm, an abrupt rise was found in the erasure magnetic field. Therefore, it is necessary to apply the erasure magnetic field of not less than 36.5 kA/m, thereby causing the erasure magnetic field generating apparatus to become bulky and causing the dissipated power to increase. When currently available magneto-optical disk drive is used, it is necessary for a reproduction layer to have a thickness of not more than 30 nm in order to realize or obtain a practical erasure magnetic field.

As is clear from Table 8, when the reproduction layer 3 had a thickness of 20 nm, the recording assistance layer 11 had a thickness of 5 nm, and the recording layer 5 had a thickness of 5 nm, no reproduction signal was obtained. The magnetization of the reproduction layer 3 is directed by the leakage magnetic fields from the recording layer 5 and the recording assistance layer 11, respectively. Accordingly, when the total thickness of the recording assistance layer 11 and the recording layer 5 becomes thinner so that the leakage magnetic fields from the recording assistance layer 11 and the recording layer 5 are reduced, it becomes impossible to reproduce the recorded information. As is clear from Table 8, according to the present embodiment, the thickness of the recording assistance layer 11 was set to 10 nm and the thickness of the recording layer 5 was set to 10 nm, i.e., the total thickness of the recording assistance layer 11 and the recording layer 5 was set to not less than 20 nm.

In the foregoing first embodiment, from view point of restraining the erasure magnetic field from enhancing, the thickness of the recording layer 5 was set to not more than 80 nm. In contrast, in the second embodiment, since the recording operation is mainly carried out by the recording assistance layer 11, there is no upper limit of the total thickness of the recording assistance layer 11 and the recording layer 5 from view point of restraining the erasure magnetic field from enhancing. However, when the total thickness of the recording assistance layer 11 and the recording layer 5 is set too great, it becomes necessary during recording operation to apply laser light having great intensity. Accordingly, it is preferable that the total thickness of the recording assistance layer 11 and the recording layer 5 is set to not more than 200 nm.

Table 9 shows the results of measured CNRs and erasure magnetic fields with a mark length of 0.45 μm by varying the thickness of the second transparent dielectric layer 4 of the magneto-optical disk A5.

TABLE 9

| THICKNESS OF SECOND TRANSPARENT DIELECTRIC LAYER (μm) | CNR (dB) | ERASURE MAGNETIC FIELD (kA/m) |
|---|---|---|
| 3 | 47.5 | 51.0 |
| 4 | 48.0 | 45.5 |
| 5 | 48.5 | 40.5 |
| 6 | 48.0 | 31.0 |
| 7 | 48.5 | 21.0 |
| 8 | 48.5 | 7.5 |
| 10 | 47.8 | 7.5 |
| 15 | 48.0 | 7.5 |
| 20 | 48.5 | 7.5 |
| 30 | 47.5 | 7.5 |
| 40 | 46.0 | 7.5 |
| 50 | 42.0 | 7.5 |

As is clear from Table 9, when the second transparent dielectric layer 4 had a thickness of not more than 5 nm, an abrupt rise was found in the erasure magnetic field. This is because the erasure magnetic field was increased based on the fact that the second transparent dielectric layer 4 became thin and the reproduction layer 3 became closer to the recording layer 5 and the recording assistance layer 11 so that the leakage magnetic field from the reproduction layer 3 greatly affected the recording layer 5 and the recording assistance layer 11. As is clear from Table 9, when the second transparent dielectric layer 4 had a thickness of not less than 8 nm, a constant erasure magnetic field of 7.5 kA/m was obtained. This is based on the fact that the leakage magnetic field from the reproduction layer 3 did not affect the recording characteristics at all and the erasure magnetic field was determined only by the recording characteristics of the recording layer 5.

The increase of the erasure magnetic field causes the magnetic generating apparatus in the magneto-optical disk drive to become bulky and causes the dissipated power to increase. Since a practical erasure magnetic field is not more than 31 kA/m for currently available magneto-optical disk drives, it is clear from Table 9 that a thickness of not less than 6 nm is required for the second transparent dielectric layer 4.

During the reproduction operation, the magnetization direction of the reproduction layer 3 is determined by the leakage magnetic fields derived from the recording layer 5 and the recording assistance layer 11. Accordingly, as is clear from Table 9, when the second transparent dielectric layer 4 had a thicness of 50 nm, the respective leakage magnetic fields derived from the recording layer 5 and the recording assistance layer 11 did not fully arrive at the reproduction layer 3, thereby causing CNR to deteriorate. In order to ensure a good signal quality, i.e., a great CNR, it was necessary for the second transparent dielectric layer 4 to have a thicness of not more than 40 nm.

<Example 6>

A plurality of magneto-optical disks in accordance with the present example were prepared by changing only the composition of the recording assistance layer 11 of the magneto-optical disk A5 of the foregoing Example 5, and recording characteristics and reproduction characteristics were measured for each disk. Table 10 shows each composition, compensation temperature, and Curie temperature of the recording assistance layer 11 of such prepared magneto-optical disks. Note that the dimension of the temperature is °C.

TABLE 10

| DISK | COMPOSITION | COMPENSATION TEMP. | CURIE TEMP. |
|---|---|---|---|
| A6 | $Gd_{0.22}(Fe_{0.83}CO_{0.17})_{0.78}$ | — | 290 |
| B6 | $Gd_{0.24}(Fe_{0.83}CO_{0.17})_{0.76}$ | — | 290 |
| C6 | $Gd_{0.26}(Fe_{0.83}CO_{0.17})_{0.74}$ | 30 | 290 |
| D6 | $Gd_{0.28}(Fe_{0.83}CO_{0.17})_{0.72}$ | 50 | 290 |
| E6 | $Gd_{0.30}(Fe_{0.83}CO_{0.17})_{0.70}$ | 95 | 290 |

TABLE 11

| DISK | CNR (dB) | ERASURE MAGNETIC FIELD (kA/m) | RECORDING MAGNETIC FIELD (kA/m) |
|---|---|---|---|
| A6 | 48.5 | 9.5 | 5.0 |
| B6 | 48.5 | 7.5 | 7.0 |
| C6 | 46.5 | 6.0 | 9.5 |
| D6 | 46.0 | 4.0 | 25.0 |
| E6 | 45.0 | 2.0 | 45.0 |

As the foregoing Example 5, each CNR of the magneto-optical disks A6, B6, C6, D6, and E6 prepared as above was measured, with a mark length of 0.45 μm and optimum reproduction conditions, by an optical pickup having a semiconductor laser whose wavelength was 680 nm. Table 11 shows the measured CNRs, the erasure magnetic fields (the magnetic field required for erasing the recording magnetic domain), and the recording magnetic field (the magnetic field required for forming the recording magnetic domain).

When comparing the respective reproduction characteristics of the magneto-optical disks A6, B6, C6, D6, and E6 with each other, as is clear from Table 11, CNRs of the magneto-optical disks A6, B6, C6, D6, and E6 became smaller in the order listed. This is because the compensation temperature of the recording assistance layer 11 rises and the leakage magnetic field from the recording assistance layer 11 becomes gradually small, and CNR becomes gradually small, accordingly. The recording layer 5 is provided so as to be adjacent to the recording assistance layer 11, thereby generating a great leakage magnetic field enough to restrain CNR from being greatly reduced.

As is clear from Tables 10 and 11, the erasure magnetic field becomes smaller as its compensation temperature becomes greater. Accordingly, it is preferable that the compensation temperature of the recording assistance layer 11 is greater. However, the recording magnetic field becomes greater as the compensation temperature of the recording assistance layer 11 becomes greater. For example, in the case of the magneto-optical disk E6, a recording magnetic field of 45 kA/m was required. Such a great recording magnetic field is not practical.

In view of the foregoing facts, the recording assistance layer 11 was set to have the following magnetic characteristics. More specifically, according to the recording assistance layer 11, (1) the compensation temperature was not more than 50° C. like the magneto-optical disks C6 and D6, or (2) the transition metal sub-lattice moment was always greater than the rare earth metal sub-lattice moment like the magneto-optical disks A6 and B6 in a temperature range of room temperature to its Curie temperature.

The foregoing descriptions deal with the case where AlN, GdFeCo, TbDyFeCo, and GdFeCo were adopted as a transparent dielectric layer, a reproduction layer, a recording layer, and a recording assistance layer, respectively, in the first and second embodiments. However, the present invention is not restricted to these materials as the respective layers.

For example, other transparent layers each having greater refractive index such as SiN, SiAlN, or $TaO_2$ may be adopted as the transparent dielectric layer.

The reproduction layer may be other magnetic layers provided that the magnetic layers show in-plane magnetization at room temperature while show perpendicular magnetization in response to temperature rise. For example, the magnetic layer, such as GdDyFeCo, GdTbFe or GdTbFeCo which mainly includes Gd as the rare earth metal, may be adopted as the reproduction layer.

For example, the magnetic layer, such as DyFeCo, TbFeCo, or GdTbFeCo which mainly includes Dy or Tb as the rare earth metal, may be adopted as the recording layer.

For example, the magnetic layer, such as GdDyFeCo, GdTbFe or GdTbFeCo which mainly includes Gd as the rare earth metal, may be adopted as the recording assistance layer.

There are described above novel features which the skilled man will appreciate give rise to advantages. These are each independent aspect of the invention to be covered by the present application, irrespective of whether or not they are included wihtin the scope of the following claims.

What is claimed is:

1. A magneto-optical recording medium comprising:

a substrate;

a first transparent dielectric layer;

a reproduction layer, having a thickness of 5 nm to 30 nm, and showing in-plane magnetization at room temperature while showing perpendicular magnetization in response to temperature rise;

a second transparent dielectric layer having a thickness of 6 nm to 40 nm;

a recording layer, made of perpendicular magnetization film, having a thickness of 20 nm to 80 nm; and a protective layer, wherein said layers are laminated on said substrate in this order.

2. The magneto-optical recording medium as set forth in claim 1, wherein said recording layer has a compensation temperature $T_{Wcomp}$ of not more than 50° C.

3. The magneto-optical recording medium as set forth in claim 1, wherein said recording layer has a compensation temperature $T_{Wcomp}$ that is at least 50° C. smaller than a temperature at which transition occurs in said reproduction layer from in-plane magnetization to perpendicular magnetization.

4. The magneto-optical recording medium as set forth in claim 1, wherein said recording layer has transition metal sub-lattice moment which is always greater than rare earth metal sub-lattice moment in a temperature range of room temperature to Curie temperature $T_{WC}$ of said recording layer.

5. The magneto-optical recording medium as set forth in claim 1, wherein said reproduction layer has a compensation temperature $T_{rcomp}$ of not less than 180° C.

6. The magneto-optical recording medium as set forth in claim 1, wherein said reproduction layer has a compensation temperature $T_{rcomp}$ that is at least 30° C. greater than a temperature at which transition occurs in said reproduction layer from in-plane magnetization to perpendicular magnetization.

7. The magneto-optical recording medium as set forth in claim 1, wherein said reproduction layer has rare earth metal sub-lattice moment which is always greater than transition metal sub-lattice moment in a temperature range of room temperature to Curie temperature $T_{rc}$ of said reproduction layer.

8. The magneto-optical recording medium as set forth in claim 1, further comprising a recording assistance layer, provided to be adjacent to said recording layer, having a Curie temperature greater than that of said recording layer, wherein said recording assistance layer and said recording layer have a total thickness of not less than 20 nm; and wherein said recording assistance layer maintains the direction of the magnetization at room temperature, is reversed, along with said recording layer, in direction of magnetization by an external magnetic field during recording, and transfers the direction of the magnetization to said reproduction layer by leakage magnetic field generated by said recording layer and leakage magnetic field generated by said recording assistance layer during reproduction.

9. The magneto-optical recording medium as set forth in claim 8, wherein said recording assistance layer and said recording layer have a total thickness of not more than 200 nm.

10. The magneto-optical recording medium as set forth in claim 8, wherein said recording assistance layer has a compensation temperature of not more than 50° C.

11. The magneto-optical recording medium as set forth in claim 8, wherein said recording assistance layer has a compensation temperature that is at least 50° C. smaller than a temperature at which transition occurs in said reproduction layer from in-plane magnetization to perpendicular magnetization.

12. The magneto-optical recording medium as set forth in claim 8, wherein said recording assistance layer has transition metal sub-lattice moment which is always greater than rare earth metal sub-lattice moment in a temperature range of room temperature to Curie temperature of said recording assistance layer.

13. The magneto-optical recording medium as set forth in claim 8, wherein said recording assistance layer is provided between said second transparent dielectric layer and said recording layer.

14. The magneto-optical recording medium as set forth in claim 8, wherein said recording assistance layer is provided between said recording layer and said protective layer.

15. A method for reproducing from a magneto-optical recording medium which comprises a substrate, a first transparent dielectric layer, a reproduction layer having a thickness of 5 nm to 30 nm and showing in-plane magnetization at room temperature while showing perpendicular magnetization in response to temperature rise, a second transparent dielectric layer having a thickness of 6 nm to 40 nm, a recording layer made of perpendicular magnetization film having a thickness of 20 nm to 80 nm, and a protective layer, wherein said layers are laminated on said substrate in this order, and which further comprises a recording assistance layer provided to be adjacent to said recording layer having a Curie temperature greater than that of said recording layer, wherein said recording assistance layer and said recording layer have a total thickness of not less than 20 nm;

said method comprising the step of reproducing information recorded on said recording layer while projecting laser light having intensity smaller than that by which an abrupt change occurs in a reproduction signal due to disappearance of magnetic domains of said reproduction layer;

wherein the reproduction of the information is carried out by:

raising a temperature of said reproduction layer in response to the projection of the laser light in a range between (1) a temperature at which transition occurs in said reproduction layer from in-plane magnetization to perpendicular magnetization and (2) a compensation temperature of said reproduction layer; and copying magnetization directions of said recording layer and said recording assistance layer to said reproduction layer in accordance with static magnetic-coupling between said reproduction layer and both said recording layer and said recording assistance layer due to leakage magnetic fields derived from said recording layer and said recording assistance layer.

16. The method as set forth in claim 15, wherein said recording assistance layer of the magneto-optical recording medium is provided between said second transparent dielectric layer and said recording layer;

wherein the reproduction of the information is carried out by:

submitting the laser light passed through said reproduction layer to reflection on said recording assistance layer; and copying magnetization directions of said recording layer and said recording assistance layer to said reproduction layer while generating a Kerr rotation angle of said recording assistance layer greater than that of said recording layer upon said reflection.

* * * * *